(12) United States Patent
Calvert

(10) Patent No.: US 9,125,389 B1
(45) Date of Patent: Sep. 8, 2015

(54) UNDERWATER ELECTROCUTION DEVICE

(71) Applicant: UED Associates, Trustee for Underwater Electrocution Device CRT Trust, Manassas, VA (US)

(72) Inventor: S. Mill Calvert, Manassas, VA (US)

(73) Assignee: UED Associates, Manassas, VA (US), Trustee for Underwater Electrocution Device CRT Trust ( * ) Notice: Subject to any disclaimer, the term of this patent is extended or adjusted under 35 U.S.C. 154(b) by 0 days.

(21) Appl. No.: 14/317,440

(22) Filed: Jun. 27, 2014

(51) Int. Cl.
*A01K 79/02* (2006.01)
*A01K 81/04* (2006.01)
*A01K 81/00* (2006.01)

(52) U.S. Cl.
CPC .................. *A01K 79/02* (2013.01); *A01K 81/00* (2013.01); *A01K 81/04* (2013.01)

(58) Field of Classification Search
CPC ....... A01K 81/00; A01K 81/04; A01K 81/06; A01K 79/02
USPC .......... 43/6, 17.1, 98; 119/219, 220; 361/232; 340/573.2, 850, 852; 463/47.3; 102/502
See application file for complete search history.

(56) References Cited

U.S. PATENT DOCUMENTS

| | | | | |
|---|---|---|---|---|
| 2,233,045 A * | 2/1941 | Bonner et al. | ................. | 43/17.1 |
| 2,745,205 A * | 5/1956 | Kafka | ............................ | 43/17.1 |
| 2,850,832 A * | 9/1958 | Kreutzer | ....................... | 43/17.1 |
| 3,043,041 A * | 7/1962 | Kreutzer | ....................... | 43/17.1 |
| 3,058,252 A * | 10/1962 | Matusche | ....................... | 43/17.1 |
| 3,363,354 A * | 1/1968 | Riemer | ......................... | 43/17.1 |
| 3,363,356 A * | 1/1968 | Kreutzer | ........................ | 43/17.1 |
| 3,484,665 A * | 12/1969 | Ormsby et al. | ................ | 43/17.1 |
| 3,523,538 A * | 8/1970 | Shimizu | ............................ | 43/6 |
| 3,626,626 A * | 12/1971 | Blanc | .................................. | 43/6 |
| 3,771,249 A * | 11/1973 | Johnson et al. | ..................... | 43/6 |
| 3,971,292 A * | 7/1976 | Paniagua | ........................ | 43/112 |
| 4,019,480 A | 4/1977 | Kenalo | | |
| 4,541,194 A * | 9/1985 | Mongiello, Jr. | .................... | 43/6 |
| 4,667,431 A * | 5/1987 | Mendicino | ......................... | 43/6 |
| 4,895,128 A | 1/1990 | Okada | | |
| 5,473,501 A * | 12/1995 | Claypool | ...................... | 361/232 |
| 5,524,603 A | 6/1996 | Menzer | | |
| 5,566,643 A | 10/1996 | Charter et al. | | |
| 5,698,815 A * | 12/1997 | Ragner | ......................... | 102/502 |
| 5,732,501 A * | 3/1998 | Ausburn | ........................ | 43/17.1 |
| 6,170,477 B1 | 1/2001 | Horlock | | |
| 6,453,596 B1 * | 9/2002 | Marco | ............................ | 43/17.1 |

(Continued)

FOREIGN PATENT DOCUMENTS

DE          4441080 A1 * 4/1995 ............. A01K 79/02

*Primary Examiner* — Darren W Ark
(74) *Attorney, Agent, or Firm* — Louis Ventre, Jr.

(57) ABSTRACT

An underwater electrocution device may be used by a diver as a weapon to electrocute sharks or other underwater predators. It has a frame that defines a watertight compartment to house a motor and a generator. The motor when activated runs the generator. The electric generator is connected to a ground plate in contact with the water when the device is being used. A power supply device, such as a battery, provides power to run the motor. A spear tip is made of an electrically conducting metal. A frangible cover over the spear tip electrically insulates the spear tip, and breaks upon impact to expose the spear tip. An electrical conducting wire is attached to the trailing end of the spear tip so as to electrically connect the spear tip to the terminal of the electric generator. A spear gun ejection mechanism may be included to shoot the spear tip.

2 Claims, 1 Drawing Sheet

(56) References Cited

U.S. PATENT DOCUMENTS

| | | | |
|---|---|---|---|
| 6,636,412 B2 * | 10/2003 | Smith | 361/232 |
| 6,837,182 B2 | 1/2005 | Leblanc | |
| 6,862,994 B2 * | 3/2005 | Chang | 102/502 |
| 7,065,915 B2 * | 6/2006 | Chang | 102/502 |
| 7,174,668 B2 * | 2/2007 | Locklear | 43/17.1 |
| 7,234,262 B2 * | 6/2007 | Smith | 102/502 |
| 7,658,151 B2 * | 2/2010 | Genis et al. | 102/502 |
| 8,033,274 B2 | 10/2011 | Pedemonte | |
| 8,074,573 B1 * | 12/2011 | Linker | 102/502 |
| 8,091,269 B2 * | 1/2012 | Orchard | 43/17.1 |
| 8,342,098 B2 * | 1/2013 | Shalev et al. | 102/502 |
| 8,456,310 B2 | 6/2013 | Becker | |
| 8,555,543 B2 | 10/2013 | Baldassano | |
| 8,587,918 B2 * | 11/2013 | Hanchett et al. | 361/232 |
| 8,896,982 B2 * | 11/2014 | Beechey et al. | 361/232 |
| 2009/0231775 A1 * | 9/2009 | Coppersmith | 361/232 |

* cited by examiner

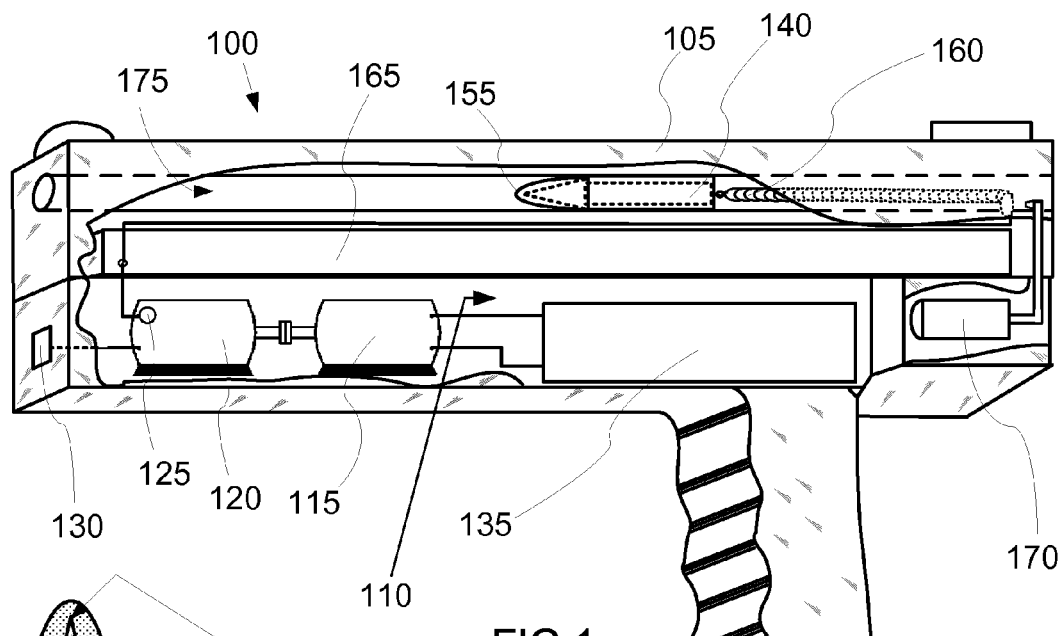
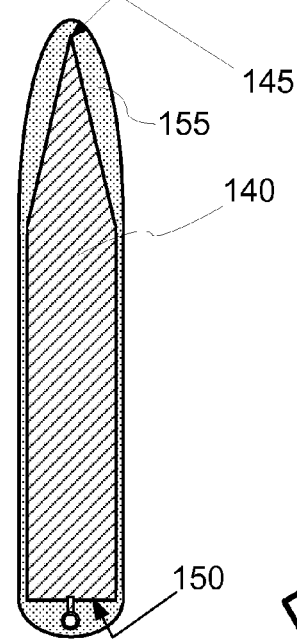
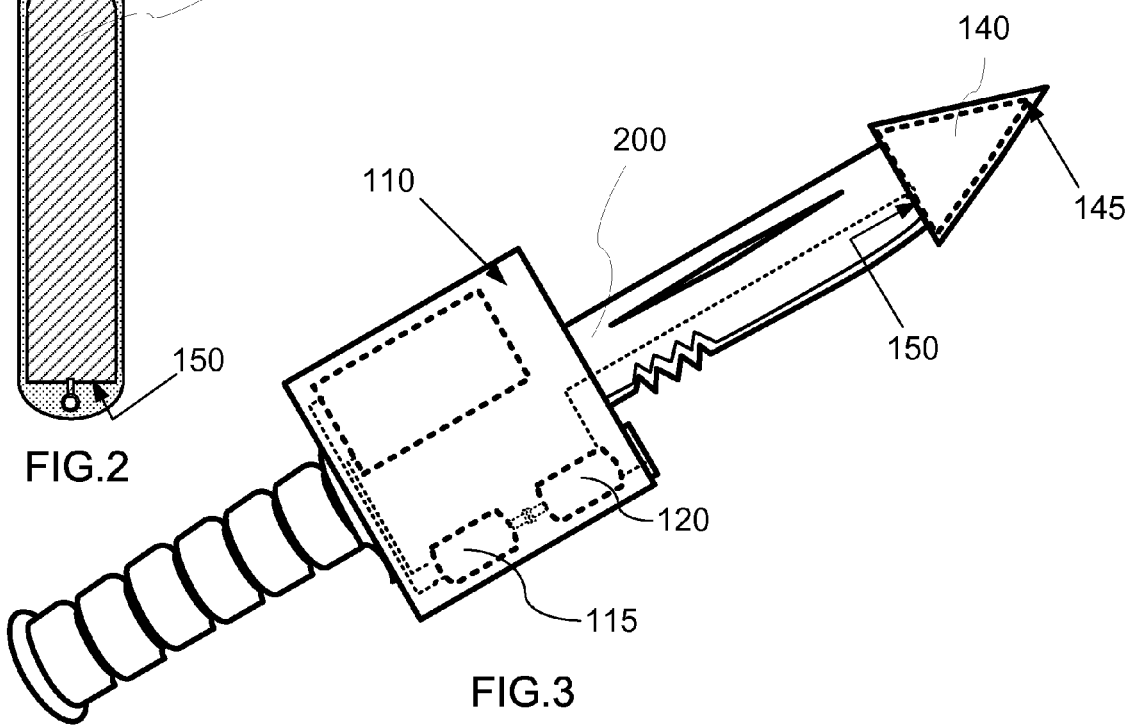

UNDERWATER ELECTROCUTION DEVICE

TECHNICAL FIELD

In the field of electric charge generating devices, a weapon carried underwater by a diver utilizes forces of the electric discharge to living beings causing an electrical shock to be produced in the living being when it comes into contact with voltage carrying spear tip shot at the living being by the diver.

BACKGROUND ART

There is a great variety of weapon choices available that one can choose from when on the surface of the Earth, but once entering the vast realm of the undersea world, the choice of offensive or defensive weapons dwindles to almost nothing. About the only choices are a hand-held knife and a spear gun, which has very limited use. Spear guns typically involve a long spear with a pointed tip loaded in the spear gun. The spear gun typically shoots the spear via a rubber band or by pneumatic means. Usually, the spear is inserted in the barrel of an elastic band type gun until it is seated in the trigger mechanism. One or two spears in a spear gun have been described and after these are shot, the spear gun must be reloaded. Spear guns are usually long, cumbersome weapons and reloading them underwater is a widely recognized as a difficult task.

Use of paired electrodes generating electric fields within sea water has been described as a means for repelling sharks and for killing nuisance aquatic life. Devices similar to cattle prods have been described. These devices, when inserted by a dry user from above the water level into the sea or other body of water typically utilize two electrodes in close proximity and operate by passing current between the electrodes. None use a single electrode for electrocuting an underwater living being, and none involve use by submerged divers holding the device like a knife, a pistol or a spear gun.

Prior art also teaches the use of bang sticks that prod a fish and simultaneously discharge a power head or shot shell to kill or disable an aggressive sea creature, such as a shark or barracuda. The bang stick is a form of underwater firearm. Accidental discharge, single shot capability, close proximity and aiming difficulties make it desirable to have an easy to use alternative that a diver can use to quickly kill any approaching sea creature.

SUMMARY OF INVENTION

An underwater electrocution device may be used by a diver as a weapon to electrocute sharks or other underwater predators. It has a frame in the form of a hand-held weapon, such as a pistol or a knife. A watertight compartment within the frame houses a motor that can be activated by the diver. The motor turns an electric generator also within the watertight compartment. The electric generator is connected to a ground plate in contact with the water when the device is being used. A terminal on the generator provides electrical output. A power supply device, such as a battery, is connected to provide power to run the motor. A spear tip is made of an electrically conducting metal and a frangible cover over the spear tip electrically insulates the spear tip, and breaks upon impact to expose the spear tip. An electrical conducting wire is attached to the trailing end of the spear tip so as to electrically connect the spear tip to the terminal of the electric generator. A capacitor may be included that is rechargeable by the generator and also electrically connected to the wire. A typical spear gun ejection mechanism may be included to shoot out the spear tip when activated. But the hand-held weapon may be in the shape of a knife where no ejection takes place.

Technical Problem

There often arises a great need for underwater weapons, but since the choices are only a knife or a spear gun, it seems as though the spirit of invention has abandoned the underwater world, which is a vast part of our globe.

Many times in underwater military operations, or warfare, there is great need for both offensive and defensive weapons to protect our seamen and accomplish their mission.

In recreational underwater activities such as scuba and skin diving, great danger is presented because of large sharks and underwater predators. A very powerful weapon is needed to protect innocent life.

Professional divers that work on underwater projects, such as oil rigs, also often need to protect themselves. Even in certain commercial fishing operations when very large fish such as tuna are being harvested, an underwater weapon that would instantly kill the fish would be more humane and much less dangerous when trying to get the fish into the fishing boat.

Solution to Problem

The solution is a hand-held weapon that can instantly kill or neutralize any form of human or marine life that is underwater and presenting a threat. Such a weapon would be a very valuable tool. It would be the underwater version of Samuel Colt's GREAT EQUALIZER. No longer would killer sharks be the great supreme predators that rip apart the human flesh of scuba divers and underwater workers. No longer would our brave soldiers and Navy Seals be relegated to underwater hand to hand combat with a single knife blade.

Advantageous Effects of Invention

An underwater weapon such as the underwater electrocution device opens up a whole new array of defensive and offensive possibilities in our vast underwater world. It is an underwater hand-held weapon like a typical gun. The underwater electrocution device can also be mounted in underwater equipment, such as mini-subs and underwater transport vehicles.

The underwater electrocution device has a pressure-sealed, water tight compartment. Inside of the compartment is a rechargeable battery pack that powers a motor, which turns a generator that produces an electric current at sufficient voltage and amperage to instantly electrocute, kill and neutralize both human and marine life.

In one embodiment, the underwater electrocution device shoots a small, sharp-edge type of projectile through the water into the target. The spear projectile has an insulated and trailing wire that follows and conducts the electric current to the tip. The spear tip is coated with an insulating plastic or gel material to insulate it from the surrounding water, which is, of course, grounded. When the sharp edge of the spear enters the body of a large fish or human, the insulating tip material is cut away and the massive voltage produces fatal amperage flowing through the target's body to reach ground. Because the target is completely grounded by being in the water, the target is instantly electrocuted and killed.

The underwater electrocution device can be made to fire on a semi-auto or fully auto basis. The spear tips or projectiles can be shot from the underwater electrocution device by various means such as compressed air and gases, propellants, or mechanical means such as the stretched rubber that is used on conventional spear guns.

The underwater electrocution device works in conjunction with the natural grounding effect of bodies of water and only needs the single wire to deliver the current to the target.

The underwater electrocution device will have tremendous benefit to our military, our commercial divers and recreational scuba divers, and commercial fishing industry that keeps us fed. The vast underwater world will now open up to man, because he has the safety and protection of the underwater version of the GREAT EQUALIZER in his hand.

BRIEF DESCRIPTION OF DRAWINGS

The drawings illustrate preferred embodiments of the underwater electrocution device according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 1 is a side perspective view of an underwater electrocution device.

FIG. 2 is a sectional elevation view of a spear tip with cover.

FIG. 3 is an elevation view of an underwater electrocution device in the form of a knife.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

FIG. 1 illustrates a preferred embodiment of an underwater electrocution device (100) for use by a diver in an underwater environment. The underwater electrocution device (100) includes a frame (105); a watertight compartment (110); a motor (115); an electric generator (120); a power supply device (135); a spear tip (140); a cover (155); and a wire (160).

The frame (105) in the form of a hand-held weapon. While FIG. 1 may be interpreted as a pistol or even a rifle, other hand-held weapon forms are possible. Thus, in an alternative embodiment shown in FIG. 3, the hand-held weapon is in the shape of a knife (200).

The watertight compartment (110) is within the frame (105). This compartment is preferably accessible by a hinged door having a rubber gasket sealing the compartment against the inflow of water.

The motor (115) is sealed within a watertight compartment (110) so that it may operate without being shorted out by water. The motor (115) that is activatable by the diver. Preferably, such capability to activate the motor is effected by pushing a button with a finger, such as the index finger, from the diver's hand holding the underwater electrocution device (100). Alternatively, the motor is activated automatically by launching the spear tip or upon impact when the cover (155) is broken by the force of the impact.

The electric generator (120) is turned upon activation of the motor (115) within the watertight compartment (110). The electric generator (120) includes a terminal (125) and a ground plate (130) for electrical output. The ground plate (130) is connected so as to be in contact with water external to the watertight compartment (110) and thus to form an electrical ground for the electric generator when the frame (105) is underwater.

The power supply device (135) is connected to provide power to the motor (115). The power supply device (135) may be any device capable of powering the motor. Some examples are a battery, a capacitor, and a compressed gas supply. If a compressed gas supply is used for a pneumatically driven motor, a pressure relief valve would enable exhaust out of the watertight compartment (110). The capacitor (165) is preferably rechargeable by the electric generator (120) and is electrically connected to the wire (160).

The spear tip (140) is defined by a leading end (145) that is pointed and a trailing end (150), the spear tip (140) being made of an electrically conducting metal. The spear tip may sit at the end of a longer shaft so that it would be similar to a spear gun.

The cover (155) over the spear tip (140) electrically insulates the spear tip (140). The cover (155) is made of a frangible material that breaks upon impact. Such materials are well known and are typically made of plastic.

The wire (160) is electrically conducting, that is, it is an electrical conductor. The wire (160) is preferably attached to the trailing end (150) of the spear tip (140) so as to electrically connect the spear tip (140) to the terminal (125) of the electric generator (120).

A preferred embodiment of the underwater electrocution device (100) works like spear gun in that it uses an ejection mechanism (170) that is adapted to shoot out the spear tip (140) when the underwater electrocution device (100) is activated. The ejection mechanism (170) shown in FIG. 1 is a compressed gas that is released into the ejection tube (175) behind the spear tip (140). The ejection mechanism (170) may also use any spear propelling device typically used in spear guns, such as for example a rubber band, a spring or other such devices well known in the art.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the diving industry.

What is claimed is:

1. An underwater electrocution device for use by a diver, the underwater electrocution device comprising:
   a frame in the form of a hand-held weapon, the frame defining an ejection tube which extends along a longitudinal axis thereof;
   a watertight compartment within the frame, the longitudinal axis of the ejection tube extending within the frame so as to be laterally spaced completely above the watertight compartment;
   a motor sealed within the watertight compartment that is activatable by the diver;
   an electric generator turned upon activation of the motor within the watertight compartment, the electric generator comprising a terminal and a ground plate for electrical output, wherein the ground plate is connected so as to be in contact with water external to the watertight compartment and thus to form an electrical ground for the electric generator when the frame is underwater;

a power supply device connected to provide power to the motor;

a spear tip contained within the ejection tube, the spear tip defined by a leading end that is pointed and a trailing end, the spear tip being made of an electrically conducting metal;

an ejection mechanism adapted to eject the spear tip from the frame through the ejection tube when activated;

a cover over the spear tip that electrically insulates the spear tip, the cover made of a frangible material that breaks upon impact; and a wire that is electrically conducting, the wire attached to the trailing end of the spear tip so as to electrically connect the spear tip to the terminal of the electric generator.

2. The underwater electrocution device of claim 1, further comprising a capacitor rechargeable by the generator and electrically connected to the wire.

\* \* \* \* \*